(12) United States Patent
Palmieri et al.

(10) Patent No.: US 9,683,757 B2
(45) Date of Patent: Jun. 20, 2017

(54) SOLAR THERMAL PANEL ARRAY FIELD ARRANGEMENT AND RELATED VACUUM SOLAR THERMAL PANEL

(71) Applicant: TVP SOLAR SA, Geneva (CH)

(72) Inventors: Vittorio Palmieri, Geneva (CH); Francesco Di Giamberardino, Colleferro (IT)

(73) Assignee: TVP SOLAR SA, Geneva (CH)

( * ) Notice: Subject to any disclaimer, the term of this patent is extended or adjusted under 35 U.S.C. 154(b) by 241 days.

(21) Appl. No.: 14/405,455

(22) PCT Filed: Jun. 5, 2013

(86) PCT No.: PCT/EP2013/001659
§ 371 (c)(1),
(2) Date: Dec. 4, 2014

(87) PCT Pub. No.: WO2013/182310
PCT Pub. Date: Dec. 12, 2013

(65) Prior Publication Data
US 2015/0136117 A1    May 21, 2015

(30) Foreign Application Priority Data
Jun. 6, 2012  (EP) .................... 12170941

(51) Int. Cl.
*F24J 2/24*  (2006.01)
*F24J 2/04*  (2006.01)
(Continued)

(52) U.S. Cl.
CPC .............. *F24J 2/0483* (2013.01); *F24J 2/05* (2013.01); *F24J 2/24* (2013.01); *F24J 2/265* (2013.01);
(Continued)

(58) Field of Classification Search
CPC ........ F24J 2002/0038; F24J 2/265; F24J 2/24; F24J 2002/5275; F24J 2/05; F24J 2/507; F24J 2/0483
(Continued)

(56) References Cited

U.S. PATENT DOCUMENTS 3,965,887 A * 6/1976 Gramer .................... F24J 2/204
                                                        126/666
4,038,965 A * 8/1977 Lyon ........................ F24J 2/265
                                                        126/654
(Continued)

FOREIGN PATENT DOCUMENTS

EP    2283282      2/2011
WO    2009046352   4/2009

OTHER PUBLICATIONS

International Search Report from International Application No. PCT/EP2013/001659.
(Continued)

*Primary Examiner* — Avinash Savani
*Assistant Examiner* — Deepak Deean
(74) *Attorney, Agent, or Firm* — Fox Rothschild LLP

(57) ABSTRACT

The present application relates to a solar array field (100) having an improved configuration, comprising a plurality of vacuum solar thermal panel (1) and a hydraulic circuit (10) for circulating a heat transfer fluid, said hydraulic circuit (10) comprising at least one circulation path (13, 14, 15, 16) connecting a low-temperature inlet (11) to a high-temperature outlet (12), said circulation path (13, 14, 15, 16) comprising a forward portion (15) successively traversing a plurality of vacuum solar thermal panels (1); said circulation path (13, 14, 15, 16) further comprising a return portion (16)
(Continued)

connected downstream to said forward portion (15), said return portion (16) traversing the same vacuum solar thermal panels (1) in reverse order.

6 Claims, 5 Drawing Sheets

(51) Int. Cl.
    *F24J 2/26*     (2006.01)
    *F24J 2/50*     (2006.01)
    *F24J 2/05*     (2006.01)
    *F24J 2/00*     (2014.01)

(52) U.S. Cl.
    CPC .......... *F24J 2/50* (2013.01); *F24J 2002/0038* (2013.01); *Y02E 10/44* (2013.01)

(58) Field of Classification Search
    USPC ................................................ 126/628–677
    See application file for complete search history.

(56) References Cited

U.S. PATENT DOCUMENTS

| | | | | |
|---|---|---|---|---|
| 4,051,832 A * | 10/1977 | Stelzer | ................... | F24J 2/0488 126/666 |
| 4,054,124 A | 10/1977 | Knoos | | |
| 4,098,259 A * | 7/1978 | Barber, Jr. | ............... | F24J 2/265 126/661 |
| 4,211,209 A * | 7/1980 | Gay | ......................... | F24J 2/204 126/587 |
| 4,269,172 A * | 5/1981 | Parker | ..................... | F24J 2/045 126/621 |
| 4,269,173 A * | 5/1981 | Krueger | ................. | F24J 2/4636 126/569 |
| 4,291,683 A * | 9/1981 | Bayles | ..................... | F24J 2/045 126/623 |
| 4,312,325 A * | 1/1982 | Voges | .................. | F24D 11/003 126/588 |
| 4,332,241 A * | 6/1982 | Dalstein | ................ | E06B 3/6612 126/570 |
| 4,392,359 A * | 7/1983 | Franklin | ................ | F24J 2/0015 126/660 |
| 4,407,269 A * | 10/1983 | Hopper | ..................... | F15D 1/02 126/634 |
| 4,423,718 A * | 1/1984 | Garrison | ............... | E06B 3/6612 126/655 |
| 5,509,246 A * | 4/1996 | Roddy | .................... | E04D 1/265 126/621 |
| 6,079,170 A * | 6/2000 | Slebos | ..................... | F24J 2/045 52/220.1 |
| 7,810,491 B2 * | 10/2010 | Benvenuti | .................. | F24J 2/05 126/653 |
| 8,196,369 B2 * | 6/2012 | Pao | ..................... | F24D 17/0015 52/173.3 |
| 8,201,382 B1 * | 6/2012 | Pao | ......................... | F24J 2/045 52/173.3 |
| 2005/0016524 A1 * | 1/2005 | Broatch | ................... | F24J 2/045 126/622 |
| 2007/0227533 A1 * | 10/2007 | Butler | ..................... | F24J 2/265 126/651 |
| 2008/0141999 A1 * | 6/2008 | Hanken | .................... | F24J 2/045 126/621 |
| 2011/0146667 A1 * | 6/2011 | Benvenuti | .................. | F24J 2/05 126/653 |

OTHER PUBLICATIONS

International Preliminary Report on Patentability from International Application No. PCT/EP2013/001659.

* cited by examiner

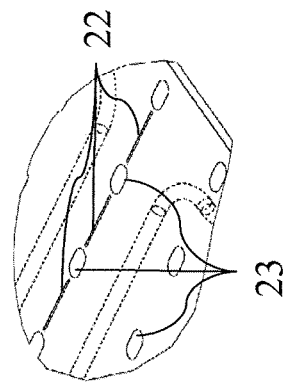
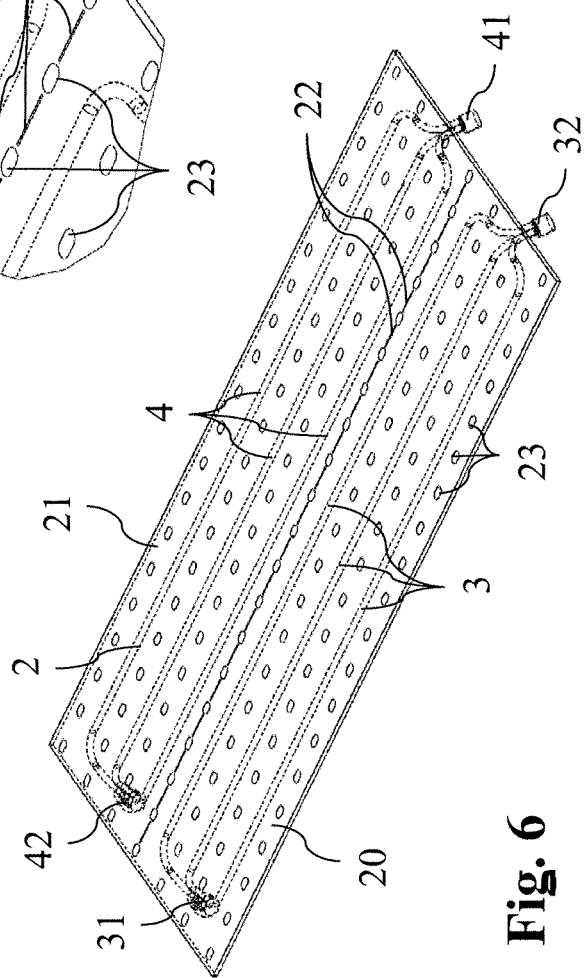

SOLAR THERMAL PANEL ARRAY FIELD ARRANGEMENT AND RELATED VACUUM SOLAR THERMAL PANEL

CROSS-REFERENCE TO RELATED APPLICATIONS

This application is a §371 national stage entry of International Application No. PCT/EP2013/001659 filed Jun. 5, 2013, which claims priority to European Application No. 12170941.4 filed Jun. 6, 2012, both of which are hereby incorporated by reference in their entireties.

FIELD OF APPLICATION

The present invention relates to a solar array field arrangement and to a vacuum solar thermal panel specifically adapted for being used in such solar array field arrangement.

PRIOR ART

As it is well known, vacuum solar thermal panels comprise a flat vacuum tight envelope with at least a glass plate transparent to visible solar radiation. Inside the vacuum envelope are disposed a heat-absorbing plate and a pipe entering and exiting the envelope connected to the heat-absorbing plate.

The solar radiation thus enters the vacuum envelope through the front plate, is collected by the heat-absorbing plate and converted into heat. The converted heat is then transferred to the heat transfer fluid flowing into the pipe.

Vacuum solar thermal panels are typically connected together by external piping to form a solar arrayfield. In solar arrayfields, pumping means are provided to circulate the heat transfer fluid from an inlet to an outlet, through the internal pipes of every single vacuum solar thermal panel. The heat transfer fluid is progressively heated from the heat-absorbing plates of the panels, so that a temperature increase is provided between the inlet and the outlet of the array field. This temperature difference is then supplied to an external load (i.e. absorption cycle chiller) to make use of solar thermal power.

Depending on the type of panel, two alternative piping configurations are employed.

Vacuum solar thermal panels of the meander type, which are described for instance in EP2283282 in the name of the same Applicant, require a series-parallel configuration of the type depicted in FIG. 1. Indeed, given the relatively high pressure drop of the heat transfer fluid traversing a meander type panel, the above-mentioned configuration is needed to keep pump head at an acceptable level.

Vacuum solar thermal panels of the straight type, which are described for instance in the PCT application published under No. WO 2010/003653, determine a lower pressure drop in the heat transfer fluid and they may be simply connected in series, as depicted for instance in FIG. 2. It should be noted that, since straight type panels comprise a plurality of individual pipes, several external pipes are also needed to connect a panel to the next one.

In both prior art configurations described, as may be appreciated in FIGS. 1 and 2, the external piping extends for a considerable length. In order to reduce losses, a good thermal insulation, in the form of a thick low thermal conductivity layer wrapped or clamped around the pipes, has to be provided.

Such thermal insulation is particularly important in the case of medium temperature applications (100° C.-200° C.), because heat losses increase with the heat transfer fluid temperature. Moreover, such applications reduce the choice of usable insulating materials because of the high surface temperature of the piping, making fiberglass the most common option.

In a typical case of solar air cooling application, the heat transfer fluid enters the solar thermal panel array field at 165° C. and exits at 180° C. Under such conditions, keeping heat losses at 17 W/m requires 100 mm thick fiberglass insulation wrapped around all external piping. Moreover, moisture penetration in fiberglass can strongly affect fiberglass thermal conductivity and, being a soft material, it has to be protected from mechanical loads or impacts. Aluminium cladding is thus typically applied outside fiberglass insulation, making such assembly much more expensive than the piping itself.

Therefore, in view of the costs of the required thermal insulation and of its maintenance, the length of the external piping represents a serious drawback of the solar array field configurations known in the prior art.

The technical problem underlying the present invention is therefore that of providing an efficient solar array field arrangement with reduced heat losses and cost of the external piping.

SUMMARY OF THE INVENTION

A solution to the above-mentioned technical problem is provided by a solar array field comprising: a plurality of vacuum solar thermal panel and a hydraulic circuit for circulating a heat transfer fluid, said hydraulic circuit comprising at least one circulation path connecting a low-temperature inlet to a high-temperature outlet, said circulation path comprising a forward portion successively traversing a plurality of vacuum solar thermal panels; said circulation path further comprising a return portion connected downstream to said forward portion, said return portion traversing the same vacuum solar thermal panels in reverse order.

The idea underlying the present invention is that of greatly reducing the amount of insulated external piping by providing a return portion of the circulation path through the vacuum panels themselves.

Advantageously, the return portion may be directly connected to said forward portion at its downstream end.

The hydraulic circuit may comprise: a first main pipe and a second main pipe, respectively departing from the low-temperature inlet and arriving at the high-temperature outlet; and a plurality of branches defining the forward portion and the return portion of one of the circulation paths, the forward portion departing from the first main pipe, the return portion arriving at the second main pipe.

The forward portion and the return portion preferably traverse the vacuum solar thermal panels in a longitudinal direction thereof. In the standard case of a rectangular panel, this means that the path portions extend from one of the short sides of the rectangle to the opposite one. Usual pumping means are provided to circulate the heat transfer fluid inside the hydraulic circuit.

Each of the vacuum solar thermal panels may internally comprise at least a forward pipe and at least a return pipe thermally connected with heat-absorbing means, wherein the forward portion of the circulation path comprises said forward pipe and the return portion comprises said return pipe.

The heat-absorbing means may comprise a heat-absorbing plate conceptually made of two functional parts having a first part in direct contact with the forward pipe and a second part in direct contact with the return pipe, longitudinal slits being provided between the first part and the second part in order to reduce thermal conductivity between the two parts. This slits do not reduce the mechanical stiffness of the heat-absorber but are relevant for thermally decoupling the two functional parts connected either to the forward pipes or to the return pipes both carrying the heat transfer fluid flow, but at different temperatures.

In the prior art separate areas of the absorbers were provided, reducing in addition the working surface of the absorber and therefore the overall efficiency of the panel as described in PCT application published under No. WO 2008/000281. Each of the vacuum solar thermal panels may comprise a plurality of forward pipes, said forward pipes all being connected to a common first inlet port and to a common first outlet port, and a plurality of return pipes, said return pipes all being connected to a common second inlet port and to a common second outlet port.

Thanks to this layout, a single pipe is necessary for the external connection between two subsequent panels traversed by the circulation path, thus greatly limiting the heat losses of the system and the amount of thermal insulation required.

A solution to the above-mentioned technical problem is also provided by a vacuum-tight envelope, having at least a front plate transparent to solar radiation; a heat-absorbing plate enclosed within said vacuum-tight envelope; at least one forward pipe thermally connected with a first part of the heat-absorbing plate and connected to first inlet and outlet ports opening on the outside of the vacuum-tight envelope; at least one return pipe thermally connected with a second part of the heat-absorbing plate, said return pipe being connected to second inlet and outlet ports opening on the outside of the vacuum-tight envelope; means for locally reducing thermal conductivity of the heat-absorbing plate being provided between its first part and its second part.

The idea underlying the present invention is that of reducing the transverse thermal conductivity of the heat-absorbing means, so that a temperature gap may be maintained between its first and second part and between the pipes mounted thereupon. In other words, even if a single heat-absorbing plate is provided, its two parts are very poorly thermally connected. Such a panel is particularly adapted to be connected according to the previously discussed array field layout.

The means for locally reducing thermal conductivity are preferably a plurality of holes and/or slits provided on the surface of the heat-absorbing plate. However, different means may be employed that are within the common knowledge of a person skilled in the art; for instance, a strip of thermal insulating material may divide the two thermally conductive parts of the panel.

As previously said, it is advantageous to have a single heat-absorbing plate thermally divided in two parts instead of having two physically separate plates within the panel. In the first instance, a single heat-absorbing plate ensures greater stiffness and mechanical strength of the whole panel. In the second instance, the area of the separation gap between two physically separate heat-absorbing panels would not be available for the purpose of heat collection, which would result in a lower efficiency of the device.

The first inlet port and the second outlet port may be provided at one side of the vacuum-tight envelope, said second inlet port and first outlet port being provided at the opposite side of the envelope.

The first and second parts of the heat-absorbing plate may longitudinally extend from one side of the vacuum-tight envelope to the opposite side.

The means for locally reducing thermal conductivity may advantageously comprise longitudinal slits separating the first and second parts of the heat-absorbing plate.

The vacuum solar thermal panel may comprise a plurality of forward pipes and a plurality of return pipes, said forward pipes all being connected to the same first inlet port and to the same first outlet port, said return pipes all being connected to the same second inlet port and to the same second outlet port.

Thanks to such an arrangement, two subsequent panels may be connected by means of a single pipe.

The forward pipes and the return pipes are preferably parallel.

The first and second, inlet and outlet ports may advantageously be housed in a funnel projecting from a back plate of the vacuum-tight envelope.

Further characteristics and advantages shall be clearer from the detailed description, outlined hereinafter, of a preferred but not exclusive embodiment of the present finding, with reference to the attached figures provided for exemplifying and non-limiting purposes.

BRIEF DESCRIPTION OF THE DRAWINGS

In the drawings:

FIG. 6 shows a perspective view of the heat-absorbing plate and of the pipes of the vacuum solar thermal panel from FIG. 4;

FIG. 7 shows a detail of the heat-absorbing plate from FIG. 6.

DETAILED DESCRIPTION

Figure 1:
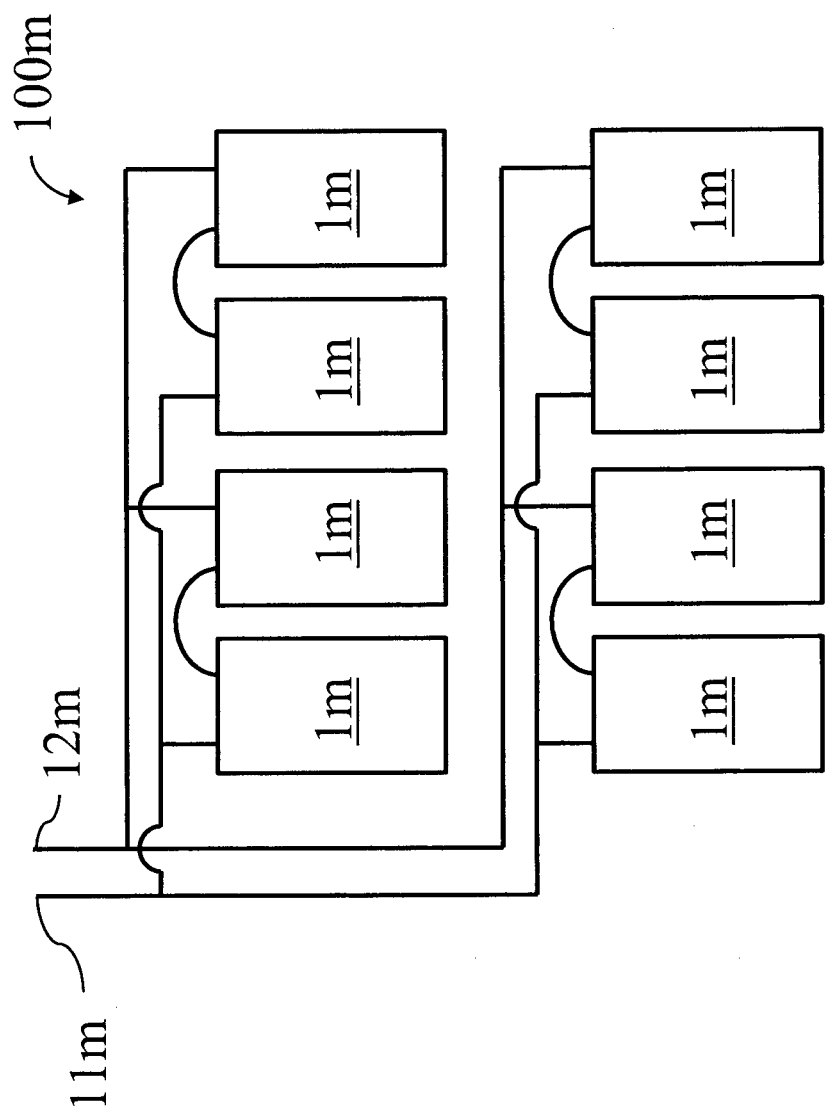
FIG. 1 schematically shows a first solar array field arrangement according to the prior art.
Figure 2:
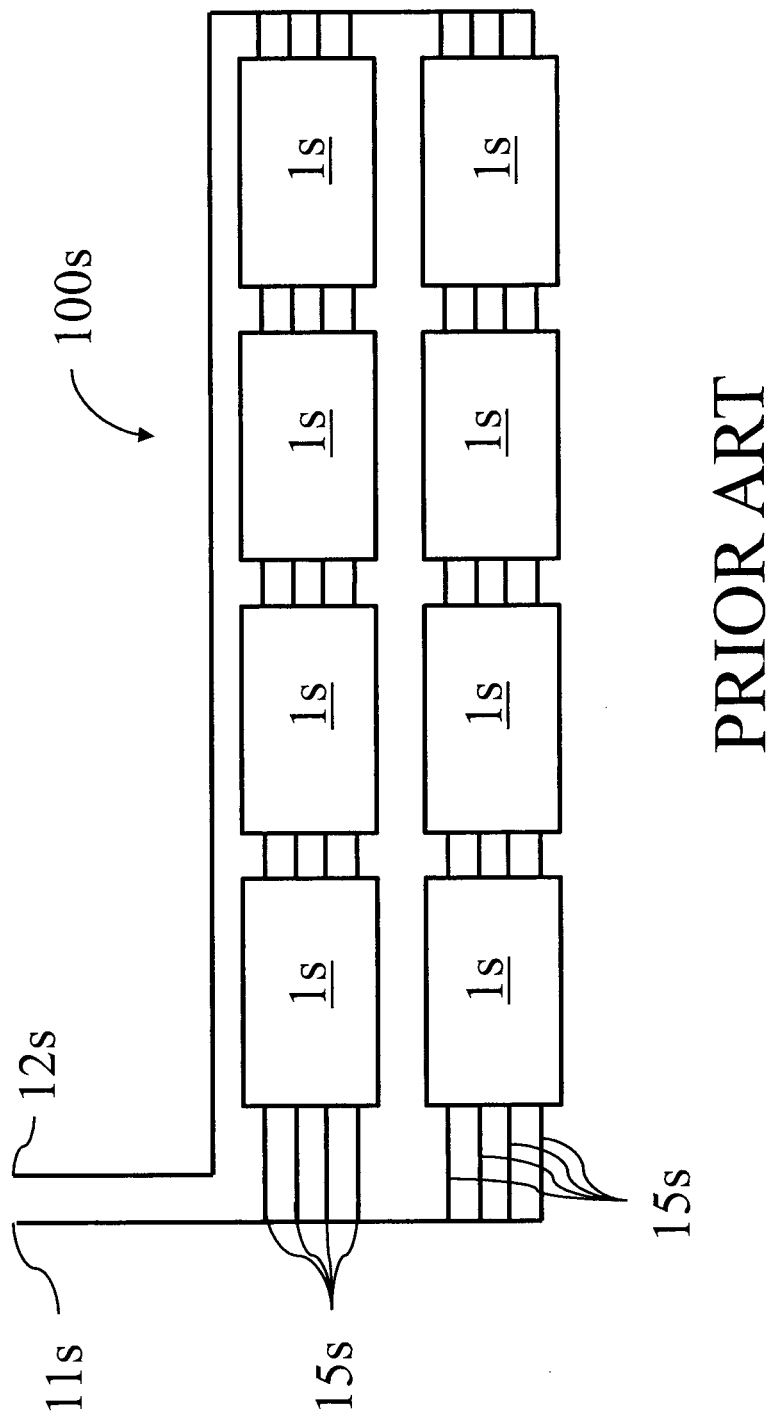
FIG. 2 schematically shows a second solar array field arrangement according to the prior art.

For a better understanding of the present invention, the prior art solar array fields depicted in FIGS. 1 and 2 are briefly described in the following.

The array fields according to the prior art comprise a hydraulic circuit having a low-temperature inlet 11*m*, 11*s* and a high-temperature outlet 12*m*, 12*s* connected by piping that traverses a plurality of vacuum solar thermal panels 1*m*, 1*s*. It should be noted that, in the context of the present invention, a hydraulic circuit or portion thereof is said to traverse a panel if its external piping is connected to the internal pipe of the panel, so that the heat transfer fluid will flow through the panels when circulating through the circuit. Pumping means (not shown) are provided to circulate the heat transfer fluid inside the hydraulic circuit; a load has to be applied between the inlet 11*m*, 11*s* and the outlet 12*m*, 12*s* in order to make use of the collected heat.

In the series-parallel piping configuration 100*m* of FIG. 1, typically employed with meander type vacuum solar thermal panels 1*m*, the hydraulic circuit comprises a plurality of parallel branches, each one traversing in series only a portion of the vacuum solar thermal panels forming a row of the array. The length of the external piping required for such an arrangement is relatively high.

In the series piping configuration 100s of FIG. 2, typically employed with straight type vacuum solar thermal panels 1s, each branch of the circuit traverses all panels of one of the array's rows. The overall external length of the hydraulic circuit is lower in such a solution but, since straight panel have a plurality of inlet and outlet ports, a corresponding plurality of external pipes is required to connect the subsequent panels in every branch of the circuit.

Figure 3:
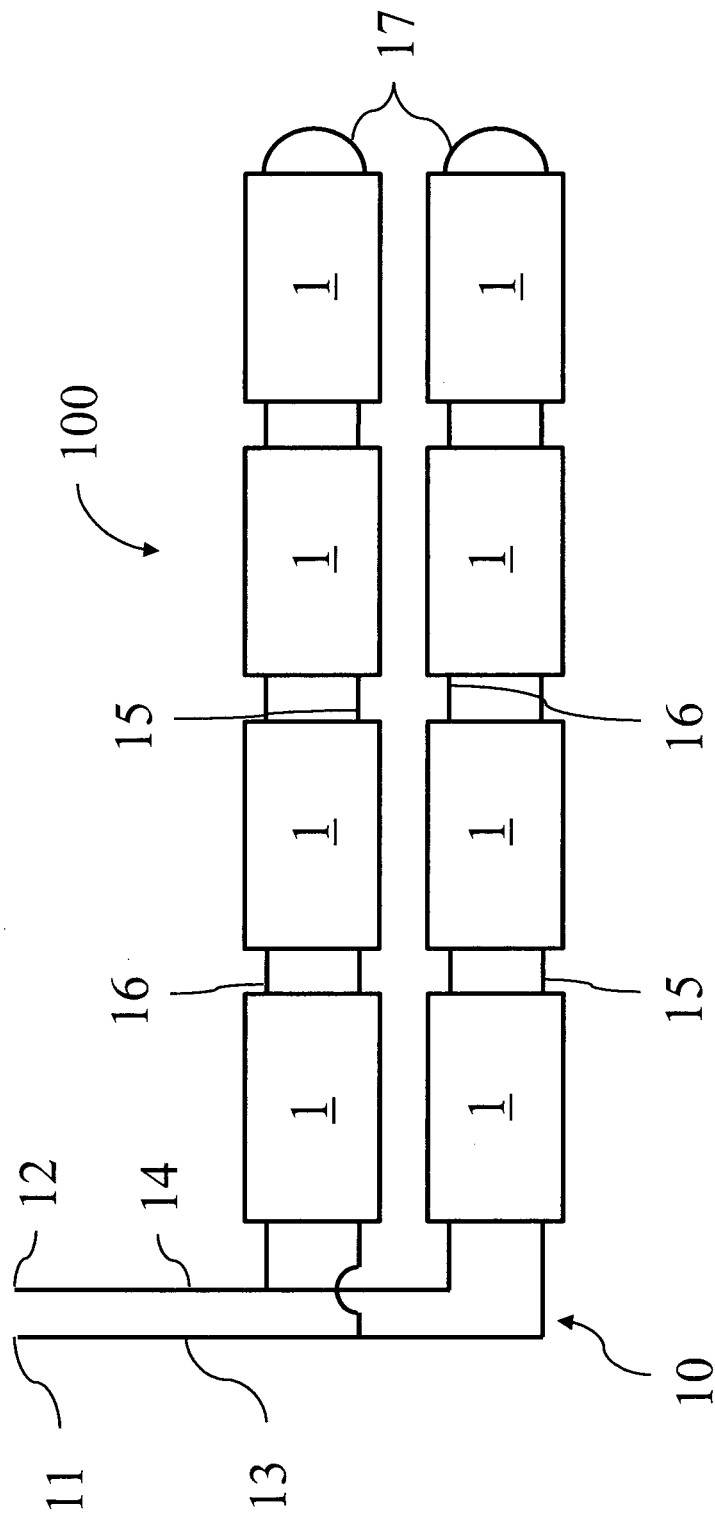
FIG. 3 schematically shows a solar array field arrangement according to the present invention.
Figure 5:
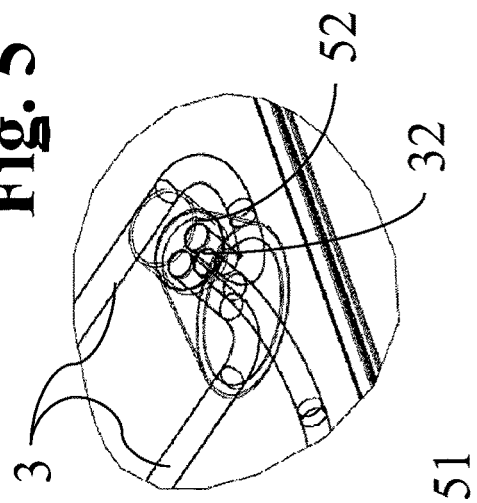
FIG. 5 shows a detail of the inner structure of the vacuum solar thermal panel from FIG. 4.
Figure 4:
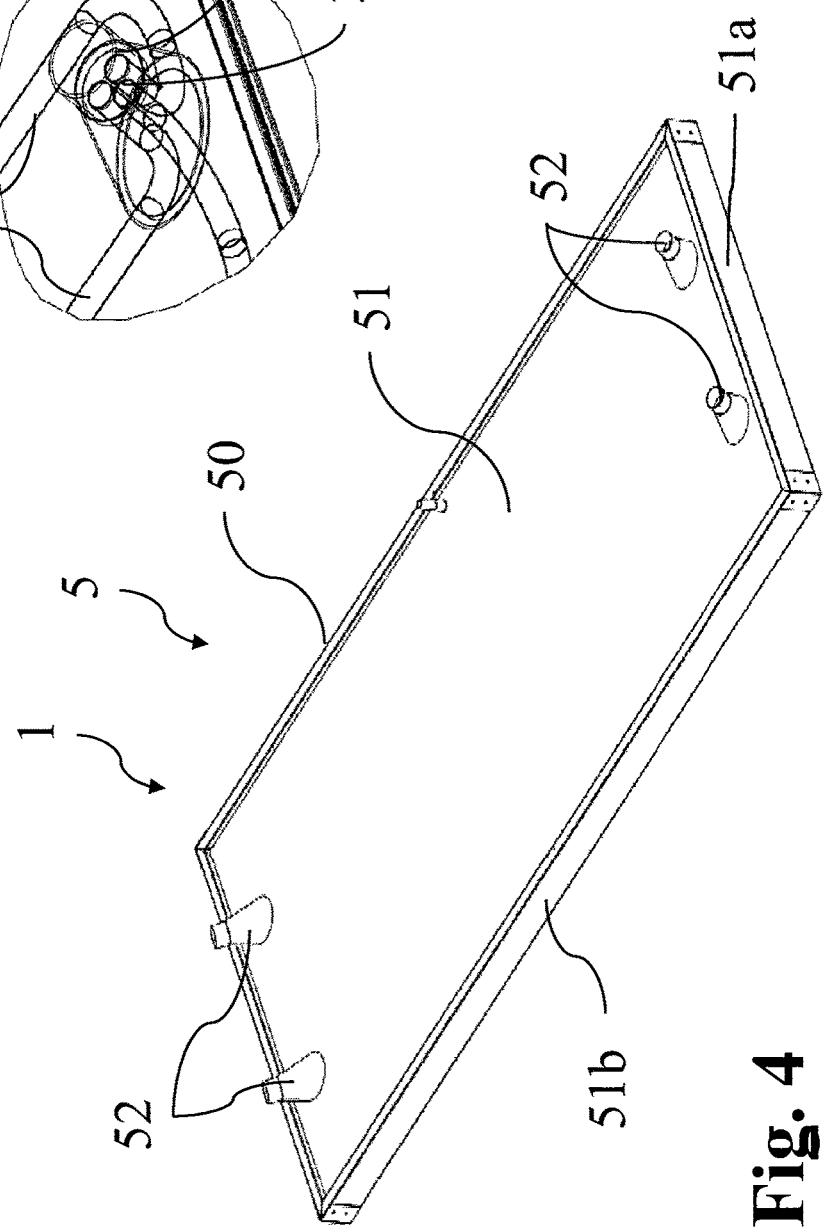
FIG. 4 shows a perspective view from below of a vacuum solar thermal panel according to the present invention.

With reference to FIG. 3 the solar array field according to the present invention is shown and globally indicated with 100.

The array field 100 comprises a hydraulic circuit 10 having a low-temperature inlet 11 and a high-temperature outlet 12; pumping means (not shown) are provided to circulate the heat transfer fluid inside the hydraulic circuit; a load has to be applied between the inlet 11 and the outlet 12 in order to make use of the collected heat.

A first main pipe 11 is connected to the low-temperature inlet 11, while a second main pipe 12 is connected to the high-temperature outlet 12. A plurality of branches 15, 16 connect the first main pipe 11 to the second main pipe 12, each branch defining a different circulation path for the heat transfer fluid. The simplified embodiment depicted in FIG. 3 only features two branches, i.e. two circulation paths are available for the heat transfer fluid.

The branches reach and traverse a plurality of vacuum solar thermal panels 1, which are arranged in rows. In particular, each one of the branches connects all the panels making up a single row. A branch comprises a forward path portion 15 that traverses in series the row panels 1; and a return portion 16 that traverses the same panels 1 in reverse order. A loop portion 17 connects the forward portion 15 to the return portion 16 at the end of the row.

The vacuum solar thermal panels 1 comprise a vacuum-tight envelope 5, which in turn is made up of a front plate (not visible in the figures), transparent to solar radiation, and a support structure 50 meant to support the front plate.

The support structure 50 comprises a substantially rectangular back plate 51 and side walls shorter 51a and longer 51b rising from the perimeter of the back plate 51. The front plate, which is a substantially flat glass pane, closes the box-like structure formed by the back plate 51 and the side walls 51a, 51b.

The back plate 51 features four funnels 52, projecting outward of the vacuum-tight envelope 5. Such funnels are disposed two by two at the opposite shorter walls 51a of the support structure.

A heat-absorbing plate 2, visible in FIGS. 6 and 7, is enclosed within the vacuum-tight envelope 5, i.e. sandwiched between the front plate and the back plate 51. Said heat-absorbing plate features a plurality of through holes 23 crossed by uprights (not shown in the picture) for supporting the front plate.

The heat-absorbing plate 2 has a substantially rectangular shape that matches the shape of the vacuum-tight envelope 5. The plate 2 is longitudinally divided in two equal halves, named first portion 20 and second portion 21 in the following.

The first portion 20 and the second portion 21 of the heat-absorbing plate 2 are divided by a plurality of longitudinal slits 22, extending along the median section of the heat-absorbing plate. As may be seen in FIG. 7, such longitudinal slits 22 are alternated with the through holes 23 lying on the median section of the plate. Slits 22 and holes 23 cooperate to define a material discontinuity between the first portion 20 and the second portion 21. Such a discontinuity locally determines a drop in the thermal conductivity of the plate 2, so that the first 20 and second 21 portions can be easily maintained at different temperatures.

The vacuum solar thermal panel 1 also comprises a plurality of forward pipes 3 and a plurality of return pipes 4. The pictured embodiment shows three forward pipes 3 and three return pipes 4. The pipes 3, 4 are directly attached to the back of the heat-absorbing plate 2, i.e. to the surface of the plate facing the back plate 51. The pipes 3, 4 are parallel and they extend in a longitudinal direction of the panel 1, substantially reaching the two opposite shorter ends.

The forward pipes 3 converge at their opposite ends, to form respectively a first inlet port 31 and a first outlet port 32. In the same way, the return pipes 4 converge to form a second inlet port 41 and a second outlet port 42. Such ports 31, 32, 41, 42 are housed in the funnels 52 on the back side of the vacuum-tight envelope 5.

It should be noted that the first inlet port 31 and the second outlet port 42 are provided at one side of the vacuum-tight envelope 5, while the second inlet port 41 and the first outlet port 32 are provided at the opposite side of the envelope 5. Therefore, the heat transfer fluid will flow through the forward pipes 3 in a given longitudinal direction, and will flow through the return pipes 4 in the opposite longitudinal direction.

When the vacuum solar thermal panel 1 is connected to the solar array field 100, the first inlet port 31 and the second inlet port 32 are connected to external pipes of a forward path portion 15, while the second inlet port 41 and the second outlet port 42 are connected to external pipes of a return path portion 16.

Therefore, the forward pipes 3 form part of the forward path portion 15, while the return pipes 4 form part of the return path portion 16. Given that the heat transfer fluid progressively heat during circulation through the forward 15 and return portions 16, the temperature of the fluid in the return pipes 4 will be higher than the temperature of the fluid in the forward pipes 3. Such a temperature gap may become as high as 15° C. for the first panel of each row. Since the pipes 3, 4 are in thermal communication with the two different parts 20, 21 of the heat-absorbing plate, it is clearly advantageous to have a plate with a limited transversal conductivity.

When considering a solar thermal panel array field of 100 panels, each having dimensions of 2×1 m, consisting of 5 rows of 20 panels each, the overall savings in terms of insulated pipe length is 270 m and 100 m when compared with a typical meander or straight type panel array configuration respectively. Also, assuming typical losses of 17 W/m, for 100 mm thick fiberglass insulation of external piping in the above mentioned array configurations, overall heat losses are reduced by 4.5 kW and 1.7 kW respectively, corresponding to 8% and 3% of the total typical peak power of the solar array field operating at 165-180° C.

Obviously, the afore-described finding may be subjected to numerous modifications and variants—by a man skilled in the art with the aim of meeting the possible and specific requirements—all falling within the scope of protection of the invention as defined by the following claims.

The invention claimed is:

1. A solar array field comprising a plurality of vacuum solar thermal panels and a hydraulic circuit for circulating a heat transfer fluid through said vacuum solar thermal panels and comprising at least one circulation path connecting a low-temperature inlet to a high-temperature outlet each vacuum solar thermal panel comprising: a vacuum-tight envelope; a single heat-absorbing plate, enclosed within said vacuum-tight envelope, having: a first part; a second part; and longitudinal slits between the first part and the second part in order to reduce thermal conductivity between the two parts; each vacuum solar thermal panel further comprising: at least a forward pipe thermally connected with said heat-absorbing plate and in direct contact with the first part thereof; and at least a return pipe thermally connected with said heat-absorbing plate and in direct contact with the second part thereof; each vacuum solar thermal panel having, within the vacuum-tight envelope, no internal fluid connection between its forward pipe and its return pipe; the forward pipes of said vacuum solar thermal panels being connected in series to define a forward portion of said circulation path; the return pipes of said vacuum solar thermal panels being connected in series to define a return portion of said circulation path connected downstream to said forward portion; the forward portion successively traversing the vacuum-tight envelopes of said plurality of vacuum-solar thermal panels, the return portions traversing the same vacuum-tight envelopes in reverse order.

2. The solar array field according to claim 1, wherein said return portion is directly connected to said forward portion at its downstream end.

3. The solar array field according to claim 1, wherein said hydraulic circuit comprises: a first main pipe and a second main pipe, respectively departing from the low-temperature inlet and arriving at the high-temperature outlet; and a plurality of branches defining the forward portion and the return portion of one of the circulation paths, the forward portion departing from the first main pipe, the return portion arriving at the second main pipe.

4. The solar array field (100) according to claim 1, wherein the forward portion and the return portion traverse the vacuum solar thermal panels in a longitudinal direction thereof.

5. The solar array field according to claim 1, wherein pumping means are provided to circulate the heat transfer fluid inside the hydraulic circuit.

6. The solar array field according to claim 1, wherein each of the vacuum solar thermal panels comprises a plurality of forward pipes, said forward pipes all being connected to a common first inlet port and to a common first outlet port, and a plurality of return pipes, said return pipes all being connected to a common second inlet port and to a common second outlet port.

* * * * *